Figure 1:
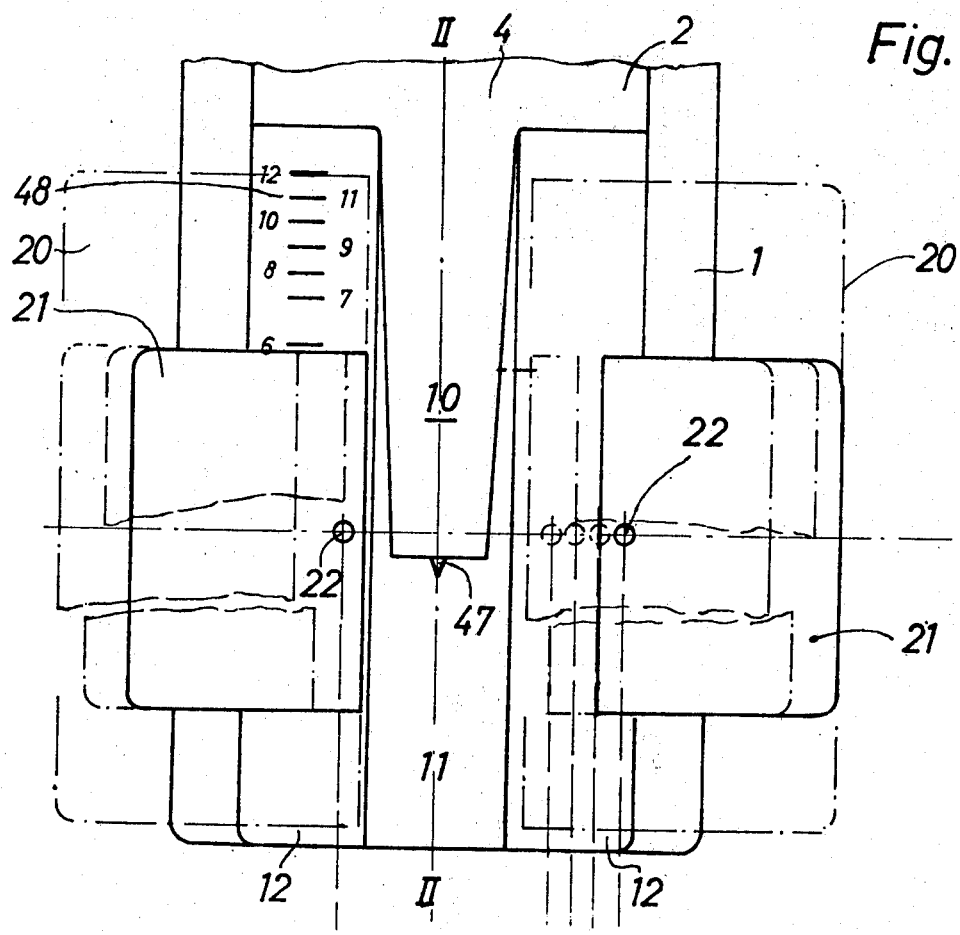

United States Patent [19]
Reich et al.

[11] 3,973,458
[45] Aug. 10, 1976

[54] DEVICE FOR PUNCHING PROGRAM STRIPS

[75] Inventors: Walter Reich, Moriken; Kurt Schaffner, Reinach, both of Switzerland

[73] Assignees: Elteba AG, Lausen; Perforag Ltd., Aarau, both of Switzerland

[22] Filed: May 19, 1975

[21] Appl. No.: 578,904

[30] Foreign Application Priority Data
May 17, 1974 Switzerland............ 6806/74

[52] U.S. Cl.................. 83/414; 269/73; 83/633
[51] Int. Cl.² ........................ G06K 1/10
[58] Field of Search.......... 83/414, 410, 633; 269/67, 70, 73, 71; 214/1.1, 1.3

[56] References Cited
UNITED STATES PATENTS

| | | | |
|---|---|---|---|
| 836,423 | 11/1906 | Wilzin | 214/1.3 |
| 838,292 | 12/1906 | Wilzin | 83/414 X |
| 1,839,415 | 1/1932 | Schumacher | 83/414 |
| 2,415,866 | 2/1947 | Braun | 83/414 |

Primary Examiner—J. M. Meister
Attorney, Agent, or Firm—Schiller & Pandiscio

[57] ABSTRACT

A device for punching holes in program strips, which device includes a punch and die mechanism and a carriage for positioning a program strip. The carriage is mounted so as to be movable simultaneously in two mutually perpendicular directions in a plane, thereby permitting rapid and exact positioning of the strip relative to the punch and die. A first locking plate is fixed to the carriage and is provided with guide means which constrain the motion of the carriage in the direction of advancement of the program strip. A second locking plate is meshed with the first locking plate and controls the transverse position of the carriage. Both locking plates are provided with means for locking the carriage against further motion once the position of the carriage has been set.

5 Claims, 8 Drawing Figures

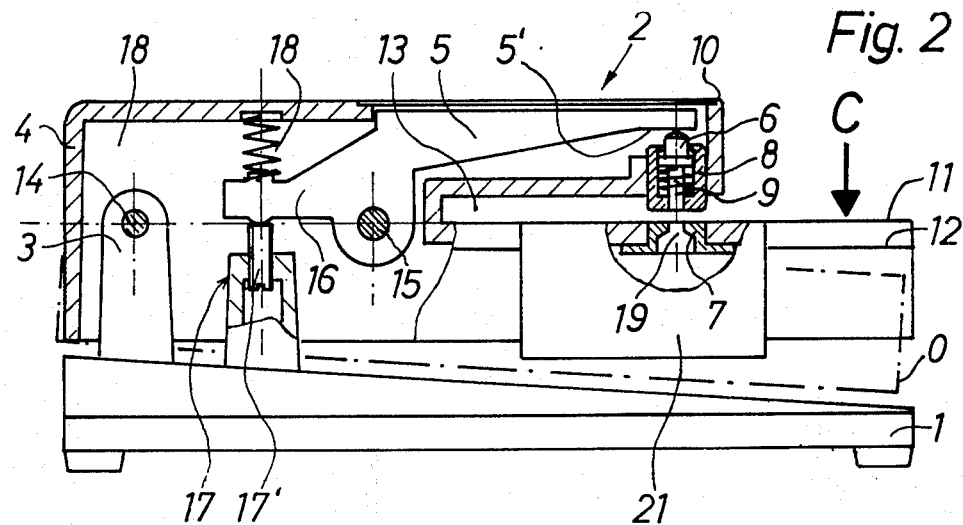
Fig. 2
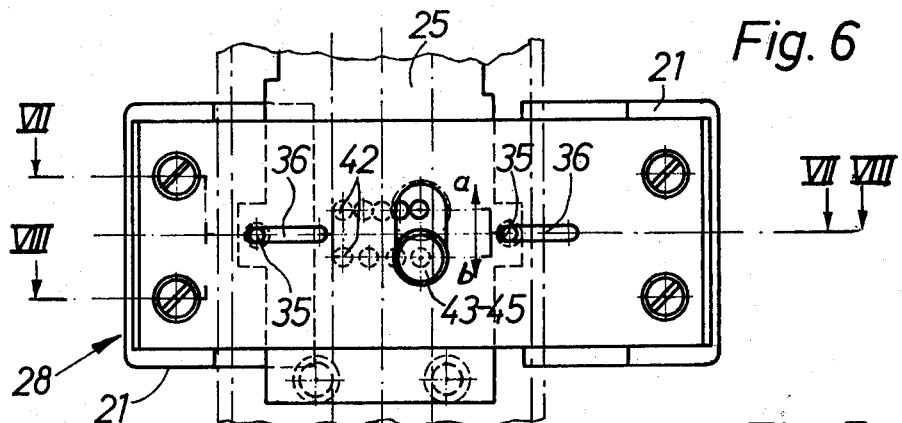
Fig. 6
Fig. 7
Fig. 8

DEVICE FOR PUNCHING PROGRAM STRIPS

The present invention concerns a device for punching program strips, comprising means for the axial and transverse alignment of the program strip relative to a punching mechanism consisting of a punch and a die, and comprising a base frame provided with means for transverse guiding of a cross slide.

In a prior device for punching program strips, a program strip provided with a feed perforation is advanced stepwise, by a sprocket roll, underneath a punching bar. Typically, the latter comprises four punch guides permitting to punch manually positioning holes in a specific program channel. In another prior device, a program strip is attached to two guide pins so that the strip can then be shifted from channel to channel by means of a positioning slide, within a row selected by the attachment. A pointer is provided for indicating the position selected from twelve channels, and a rectangular hole is punched at the selected position by operation of a punching lever.

The problem underlying the present invention is to provide a device of the described type which is, contrary to the prior devices in that it neither requires for each channel a separate punch guide nor does it perform only punching steps as predetermined by the feed perforation of the respective program strips. Such prior art devices require consequently for each strip dimension and graduation a separate apparatus, while the present device permits universal use. The device of the present invention makes it possible to punch with an unchanging basic equipment any occurring program strips with varying channel number, varying channel spacing, and various row and feed perforation spacing.

The device of the present invention for punching program strips is characterized by a slide plate fixed on the cross slide and so as to be movable on the base frame. The slide plate features guiding means for fixing the axial movement of the cross slide relative to the direction of travel of the program strip, and is further characterized by a locking plate which, on the one hand, is in mesh with the slide plate and, on the other hand, can be moved crosswise on the frame, relative to the direction of travel of the program strip. The locking plate is provided with a first lock toothing for determining the transverse position and with a second lock toothing determining the axial position of the cross slide, and by a hold-down plate connected with the frame so as to swing up relative to it while supporting at least part of said punching device.

Embodiments of the invention will be described hereafter with the aid of the drawing.

Figure 3:
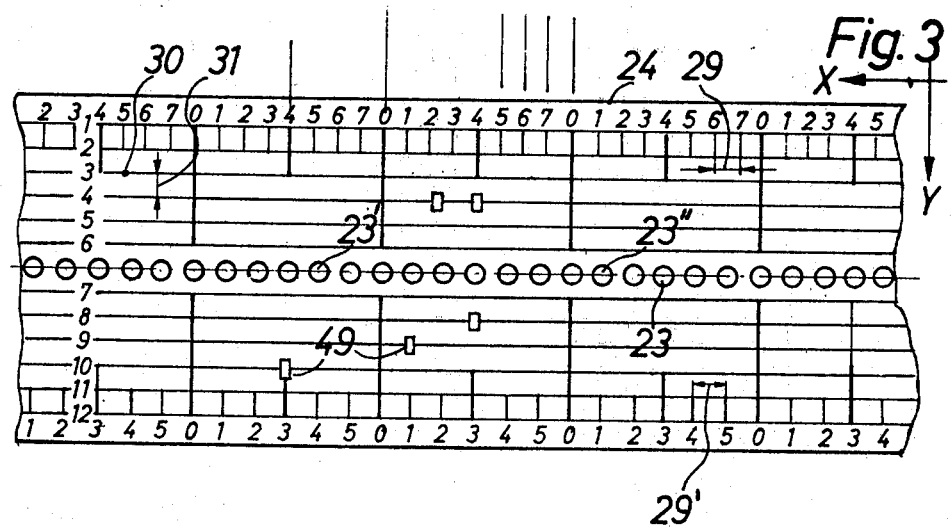
Figure 4:
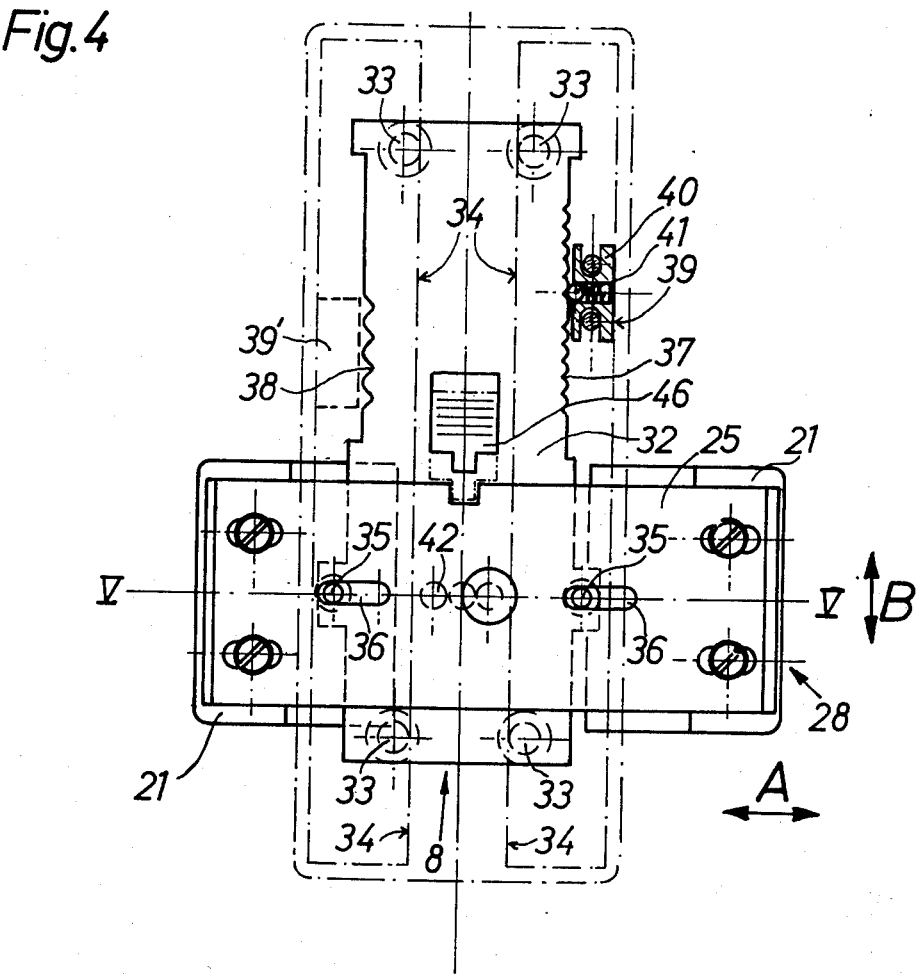
Figure 5:
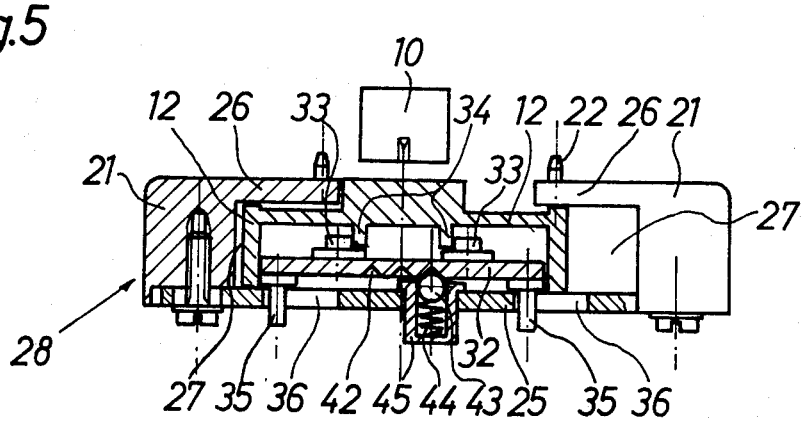

FIG. 1 shows a partial plan view of the inventional device;

FIG. 2, a partial cross section of the device along line II—II of FIG. 1;

FIG. 3, a program strip for use with a device according to FIGS. 1, 2;

FIG. 4, a bottom view of the device according to FIG. 1;

FIG. 5, a cross section along line V—V of FIG. 4;

FIG. 6, a variant of the inventional device according to FIG. 4, with two selective distances of sideways shift;

FIG. 7, a cross section along line VII—VII of FIG. 6;

FIG. 8, a cross section along line VIII—VIII of FIG. 6.

Marked 1 in FIGS. 1 and 2 is a base plate on which is mounted a punching device which overall is marked 2 and is supported by a pedestal bearing. The punching device 2 also comprises an operating lever 5 inside a support member fashioned as a housing 4, which lever serves to push the punch 6 down onto a die plate 7. The punch 6 runs in a bushing 8 and is biased by a spring 9 toward the pressure face 5' of operating lever 5. The bushing 8 is attached permanently to a protruding part of the housing which is fashioned as punching arm 10 and whose bottom is arranged opposite a bearing surface 11 which is arranged somewhat above guide sections 12, 12' of housing 4 which are provided on both sides of said surface as will be explained later in detail. Located between the underside of punching arm 10 and support surface 11 is a slot 13 through which a program strip as shown in FIG. 3 can be pulled.

The punching mechanism is operated by pushing, in the direction of arrow C (FIG. 2) and to the position 0 indicated by dash-dotted line, a punch device pivoting on a shaft 14 which extends through the side walls of the housing 4 and the pedestal bearing 3. This causes the operating lever 5 pivotally mounted on a shaft 15 which, the same as shaft 14, is mounted in the side walls of the housing 4, to swing clockwise as a result of the restoring arm 16 of operating lever 5, which bears on an adjustable-height support 17, 17' connected with the base plate 1, being forced upward against the compression force of a spring 18. The operating lever 5 also swings clockwise and the punch 6, bearing on the pressure face 5' on the right-hand end of the lever arm, is forced down into opening 19 of die plate 7 against the force of the spring 9, thereby performing a punching operation. Adjustable by means of adjusting screw 17', the height of support 17 is suitably so selected that the punch mechanism 2 will, in its nonoperative position, slant upward somewhat. The compression forces of the two springs 9 and 18 restore the punching mechanism from working position to home position. The force of each spring is selected in keeping with the primary spring purpose according to the length of the contacting lever arm of operating lever 5.

In addition to the described components, the punching mechanism 2 contains a guide facility for properly locating the program strip for punching, (e.g., according to FIG. 3), which is illustrated in detail in FIGS. 4–8. The guide facility is patterned after a cross slide and contains two bearing tables 21 which protrude sideways over the housing 4 and are provided with centering pins 22. These centering pins are intended to engage holes 23 in the program strip, which in the strip 24 according to FIG. 3 are provided axially in the strip center. The centerline spacing of the centering pins 22, 22 on bearing tables 21, 21 is so selected that it will correspond to the spacing of two specific holes 23, for instance 22' and 22'' according to FIG. 3. Since the spacing of holes 23 will not change, the strip 24 can be placed on the support tables in any position determined only by the hole positions.

The support tables 21, 21 are mounted on a support (hereafter termed transverse locking plate 25,) which together with one guide wing 26 each determines the open shift spaces 27, 27 which the guide sections 12, 12 engage on the housing bottom. Said shift spaces 27, 27 permit the slide arrangement 28 which contains the two support tables 21, 21 and the transverse locking plate 25 to move both crosswise according to double arrow A in FIG. 4 and axially according to double arrow B.

The respective range of movement is indicated in FIG. 1 by dash-dotted marginal lines 20. The shift movements of the slide arrangement 28 occur in keeping with a perforation pattern applicable to the program strip in steps of a length, in cross direction A (relative to the housing), which is determined according to the X-steps 29, 29' marked 0–7 (above) and/or 0–5 (below) on the longitudinal margins of the program strip 24. The axial movement B is governed by the distance 31 of the axial perforation tracks 30, designated 1–12 on the program strip 24 and termed Y-step hereafter.

To control these perpendicular movements, an axial locking plate 32 is provided in addition to the previously mentioned transverse locking plate 25. Both plates form together a cross slide arrangement mounted on housing 4. The axial movement is governed by guide pins 33 on the axial locking plate 32 which sideways are in contact with straight edges 34 provided on the housing inside. This will guarantee an accurate axial movement of the cross slide arrangement. The cross movement is governed by guide pins 35 mounted sideways on the axial locking plate 32 and running in slots 36 that are provided in the transverse locking plate, parallel to the direction of movement.

The length of the X and Y-steps is determined by locking plate holes which receive, under spring force, a locking component. On the axial locking plate 32 according to FIG. 4, there are click stop recesses 37 provided for that purpose, in one side face, for 12 steps while on the other side contains click stop recesses 38 for four steps. Since the number and local arrangement of click stop recesses 37, 38 depends on the number and position of axial tracks 30 on the program strip, the apparatus is very adaptable, by locking plate exchange. Shown as click stop for the axial locking plate 32, in FIG. 4, is an arrangement 39 which contains as major components an easily detachable holder component 40 and a springloaded ball 41 which is contained in a bore which at the same time serves as a spring housing. The click stop 39, 39' is selectively arranged across from those click stop recesses that correspond to the desired longitudinal index.

As can be seen best from FIGS. 5, 7, and 8, the click stop recesses for the transverse locking plate 32 are provided as well on the axial locking plate. Illustrated in FIG. 5 is an arrangement for three positions; in FIG. 7, one for five positions; and in FIG. 8, one for four positions. These recesses are preferably conical recesses 42 which are engaged by a springloaded ball 43. The latter, together with a spring 44, is installed on the transverse locking plate 25. Illustrated in FIGS. 4 and 5 is a variant where a single click stop arrangement with three positions is provided and where the transverse plate can additionally be locked in a middle position with a locking device 46. Illustrated in FIGS. 6–8, conversely, is a variant where the desired position can be selected from two click stops, by appropriate shifting of the click stop component 43–45 to position a or b (FIG. 6).

To permit a quick and properly positioned punching of the program strip, a locator nose 47 is provided on the front of the punching arm 10, while on the top side of one or both guide sections 12, 12 on the housing 4 there are scales 48 provided which relate to the click stop index for the axial movement.

When using the described device, a program strip 24 corresponding to the illustration in FIG. 3 is placed on the support tables 21, 21 (FIG. 1) and into the slot 13 (FIG. 2) in a fashion such that the centering pins 22 will engage corresponding holes 23 of the strip. Depending on the position of the holes 49 which are to be punched, the cross slide arrangement of the punching mechanism is then so shifted that upon depression of the punching mechanism into position 0 (FIG. 2) the perforations 49 will be punched (by coordinates) according to axial track 30 and X-strip 29, 29'. To move the program strip for instance forward, i.e., to the left, it is lifted off the centering pins 22 and slipped over them again in a new position as stated above. Since the punching can be performed simply by pushing down on the support tables, both hands remain free for holding the program strip.

We claim:
1. In a device for punching an elongated program strip, which device includes a punching tool formed of a punch and a die plate, a movable slide arrangement engagable with said program strip for axially and transversely aligning said strip relative to said punching tool, said strip being movable at least axially through said slide arrangement, and a housing including means for transversely and axially guiding said slide arrangement, the improvement comprising
   a first locking plate fixed to said slide arrangement for releasably coupling the latter to said housing and including guide means for determining the axial movement of said slide arrangement relative to the axial direction of travel of said program strip,
   a second locking plate meshed with said first locking plate so as to be releasably movable with respect to said housing transversely to the direction of travel of said program strip, said second locking plate being provided with first quick stop recesses for fixing the transverse position of said slide arrangement and second quick stop recesses for fixing the axial position of said slide arrangement relative to the axial direction of travel of said program strip,
   a base member upon which said housing is pivotally mounted, and
   a punch arm so pivotally connected to said housing as to be pivoted by pivotal movement of said housing, said punch arm having mounted thereon at least one component of said punching tool.

2. Device according to claim 1, characterized in that said guide means provided on said first locking plate are oblong slots, said second locking plate including pins positioned to engage respective ones of said slots, said device also including means, mounted on said first locking plate, for releasable engagement with said second click stop recesses in said second locking plate.

3. Device according to claim 2 characterized in including means mounted on said housing for releasable engagement with said first click stop recesses in said second locking plate.

4. Device according to claim 1 characterized in that said punch is mounted upon said arm and said die plate is positioned on said housing for engagement with said punch.

5. Device according to claim 1 characterized in that said first locking plate includes locking means for preventing the motion of said slide arrangement in the axial direction of travel of said program strip.

* * * * *